United States Patent [19]

Chun

[11] Patent Number: 5,416,324
[45] Date of Patent: May 16, 1995

[54] OPTICAL IMAGING DEVICE WITH INTEGRATED POLARIZER

[76] Inventor: Cornell S. L. Chun, P.O. Box 2171, Inver Grove Heights, Minn. 55076-8171

[21] Appl. No.: 75,773

[22] Filed: Jun. 11, 1993

[51] Int. Cl.[6] ............................................. G02F 1/01
[52] U.S. Cl. ................................. 250/341.3; 250/332
[58] Field of Search ............... 250/342, 349, 332, 225; 356/364, 367, 368

[56] References Cited

U.S. PATENT DOCUMENTS

| | | | |
|---|---|---|---|
| 3,631,254 | 12/1971 | Covault | 250/225 |
| 3,748,484 | 7/1973 | Covault | 250/225 |
| 3,864,513 | 2/1975 | Halajian et al. | 178/6.6 |
| 3,932,039 | 1/1976 | Frey | 250/225 |
| 4,044,247 | 8/1977 | Brown | 250/199 |
| 4,091,279 | 5/1978 | Kaufman | 250/225 |
| 4,158,506 | 6/1979 | Collett | 356/365 |
| 4,257,106 | 3/1981 | Auer | 364/525 |
| 4,333,008 | 6/1982 | Misek | 250/225 |
| 4,653,915 | 3/1987 | Frigo et al. | 356/345 |
| 4,688,897 | 8/1987 | Grinberg et al. | 350/336 |
| 4,719,343 | 1/1988 | Tressler | 250/203 R |
| 4,956,555 | 9/1990 | Woodberry | 250/339 |
| 4,956,686 | 9/1990 | Borrello et al. | 357/30 |
| 5,011,295 | 4/1991 | Krishnan et al. | 374/126 |
| 5,028,138 | 7/1991 | Wolff | 356/369 |
| 5,038,041 | 8/1991 | Egan | 250/339 |
| 5,056,889 | 10/1991 | Morgan | 356/572 |
| 5,075,749 | 12/1991 | Chi et al. | 357/30 |
| 5,081,348 | 1/1992 | Siddiqui | 356/367 |
| 5,138,162 | 8/1992 | Hacskaylo | 250/330 |

*Primary Examiner*—Paul M. Dzierzynski
*Assistant Examiner*—Richard Hanig

[57] ABSTRACT

A method and apparatus for determining the surface orientation of objects in a field of view is provided by utilizing optical polarizers and photodetector arrays. Using the disclosed imaging technique, the polarization states of light can be determined over a two-dimensional distribution corresponding to the field of view. The polarization state at each pixel is correlated with the surface orientation of the corresponding object point. This method and apparatus is suitable for the recognition of three-dimensional objects in robot vision.

16 Claims, 9 Drawing Sheets

OPTICAL IMAGING DEVICE WITH INTEGRATED POLARIZER

BACKGROUND OF THE INVENTION

1. Field of the Invention

This invention relates to imaging devices for robot vision. More particularly, this invention relates to the sensing of polarized radiation emitted by objects and the determination of the shape and pose of objects.

2. Description of Prior Art

In order to recognize three-dimensional objects, conventional methods in robot vision perform shape extraction by sensing the intensity of light reflected by objects. A fundamental problem associated with sensing the intensity of reflected light is that intensity gives one parameter while the surface orientation of objects have two degrees of freedom. Several techniques have been developed to obtain from intensity measurements at least two parameters to establish surface orientation: Photometric stereo combines multiple images, each with a different arrangement of light sources. In shape-from-shading techniques, a single brightness image is used together with assumptions about the smoothness of the objects, and characteristic curves are traced on a reflectance map. The technique of photogrammetry uses stereo pairs of images to determine object shapes. A review of these techniques using intensity is given in "Robot Vision" by B. K. P. Horn, MIT Press, Cambridge, 1986. Other problems encountered with reflected intensity techniques are that they require controlled light sources and large amounts of computation.

A technique for measuring at least two parameters for determining surface orientation is to measure intensity, percent of polarization, and angle of polarization for infrared thermal emission from objects. A method and apparatus for making measurements of only intensity and percent of polarization is described in U.S. Pat. No. 5,138,162 to Hacskaylo (1992). In the referenced patent, a single, linear polarizer covers the entire imaging sensor and two images are taken. It is well known in the art that, using two orientations of a linear polarizer, one can measure intensity and percent of polarization, but not angle of polarization. In the Hacskaylo patent each image is stored in electronic memory with the polarizer rotated between images. Among the disadvantages of the technique in the referenced patent is that the polarizer must be mechanically rotated between images which would increase the risk of mechanical failure in an operational imaging system. Another disadvantage is that the position and orientation of objects must remain constant throughout the entire sequence of images. Hence the polarization information cannot be determined if the imaging system is vibrating or if the objects are rapidly moving. A further disadvantage is that images must be stored until the entire sequence of images is captured. High resolution images will occupy large amounts of electronic storage, and the rate that images can be processed will be limited by the speed for writing to and reading from the electronic storage.

An objective of the present invention is to provide a new and improved method and apparatus for determining intensity, percent of polarization, and angle of polarization in a field of view. Another objective of the present invention is to provide a new and improved method and apparatus for determining the surface orientation of objects in a field of view.

Another objective of the present invention is to provide a method and apparatus for determining the surface orientation of objects without requiring conditions of controlled lighting. Indeed, this invention can function in darkness because the apparatus detects the thermal radiation emitted by all objects.

A further objective of the present invention is to provide a method and apparatus for determining surface orientation of objects which may be moving rapidly relative to the imaging device.

Yet another objective of the present invention is to provide a method and apparatus for determining surface orientation of objects which eliminates the mechanical rotation of polarizers.

Yet a further objective of the present invention is to provide a method and apparatus for determining surface orientation of objects which increases the rate images can be processed by reducing the requirement for electronic storage of images.

Further objectives and advantages of the present invention will become apparent from a consideration of the drawings and the description of the preferred embodiments.

SUMMARY OF THE INVENTION

A method to determine the surface orientation of objects in a field of view is provided by utilizing an optical polarizer for each pixel of an imaging sensor. Light emitted from an object point at the surface of objects is incident on the polarizer. The component of light which corresponds to the plane of the polarizer is transmitted to the sensor. The remaining component is absorbed or reflected away from the sensor. Groups of four neighboring pixels are arranged to respond to planes of polarization oriented at 0°, 45°, 90°, and 135°. By adding and subtracting the intensities of light received by the sensors at these four pixels, one can determine the total intensity, percent of polarization, and angle of polarization of light from the localized area of the object contributing to the four neighboring pixels. The percent of polarization, and angle of polarization can be used to determine the local surface orientation of the object. Surface orientation data from an ensemble of groups viewing different points on an object can be combined to determine the object's shape and pose.

DETAILED DESCRIPTION

Figure 1:
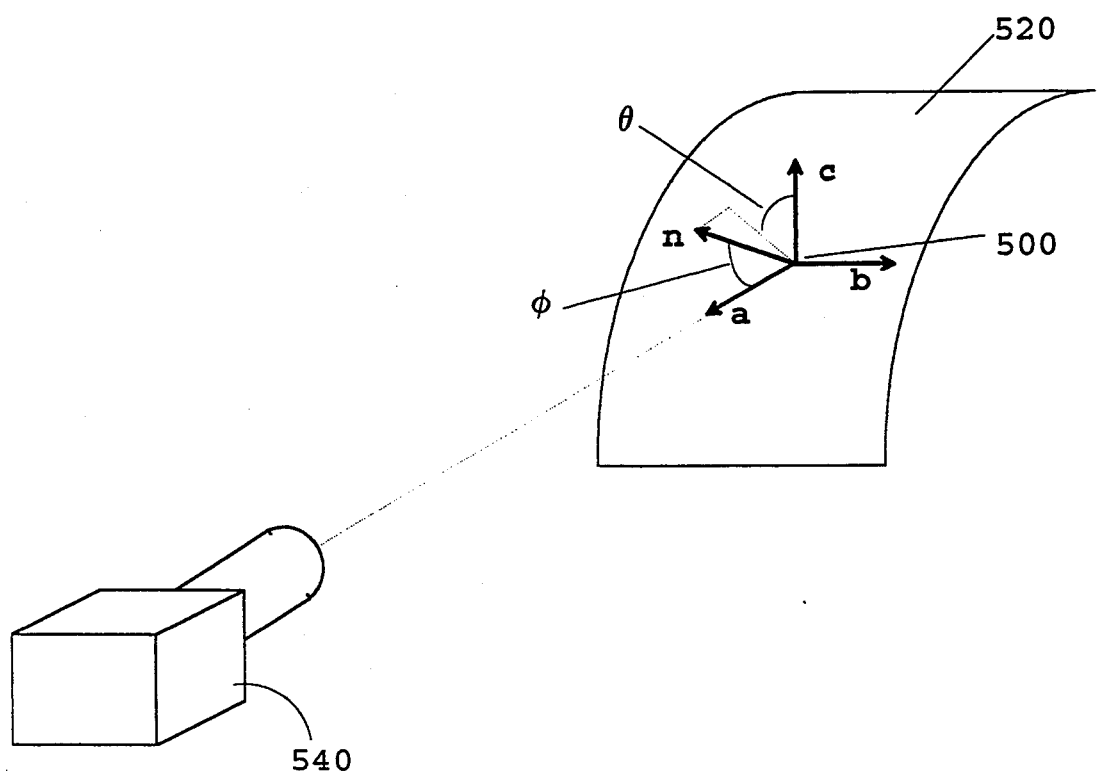
FIG. 1 is a perspective view of a curved surface of an object being imaged by a sensor.

FIG. 1 illustrates a typical situation encountered in robot vision where a sensor system 540 is viewing an object with a curved surface 520. Consider a point 500, herein called an object point, on the surface 520 which is in the field of view of sensor 540. Define a vector a as the direction from the object point to the sensor 540. Define a vector b, perpendicular to a, as laying in the horizontal direction and pointing to the right relative to the view from sensor 540. Define a vector c in the direction perpendicular to vectors a and b and pointing in the same direction as a right-handed vector cross-product of a and b. Next define n as a vector normal to the surface at surface point 500. n is perpendicular to the plane tangent to the surface 520 at object point 500. The surface orientation at object point 500 can be specified by determining two angles: $\phi$ defined as the angle between a and n, and $\theta$ defined as the angle between c and the projection of n onto the plane containing b and c. The next paragraph will describe how $\phi$ can be determined by measuring the amount of polarization in the thermal radiation emitted from object point 500 in the direction a and how $\theta$ can be determined by measuring the plane of polarization of the thermal radiation.

Figure 2A:
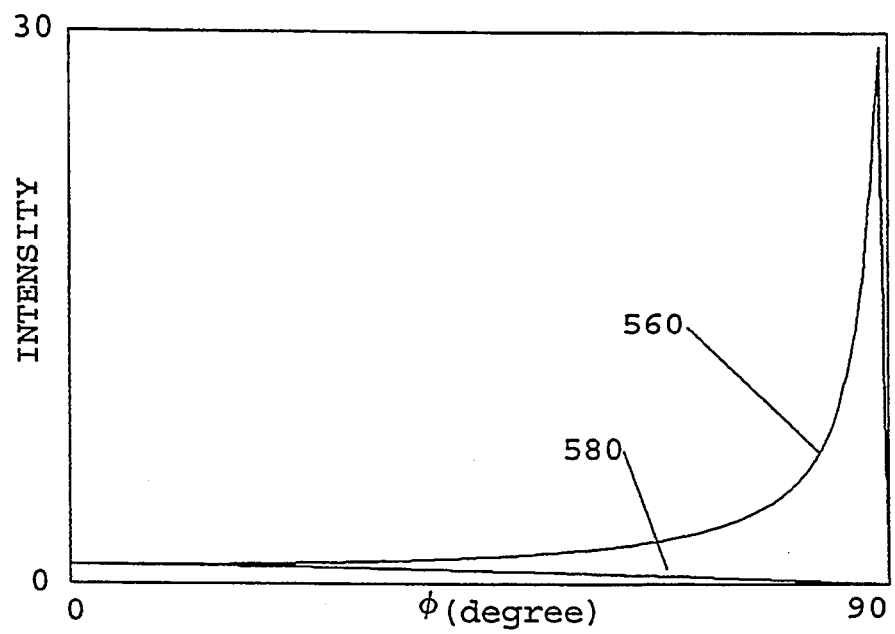
FIG. 2A and 2B are diagrams representing experimentally determined relationship between thermal radiation flux and angle of emission for aluminum.
Figure 2B:
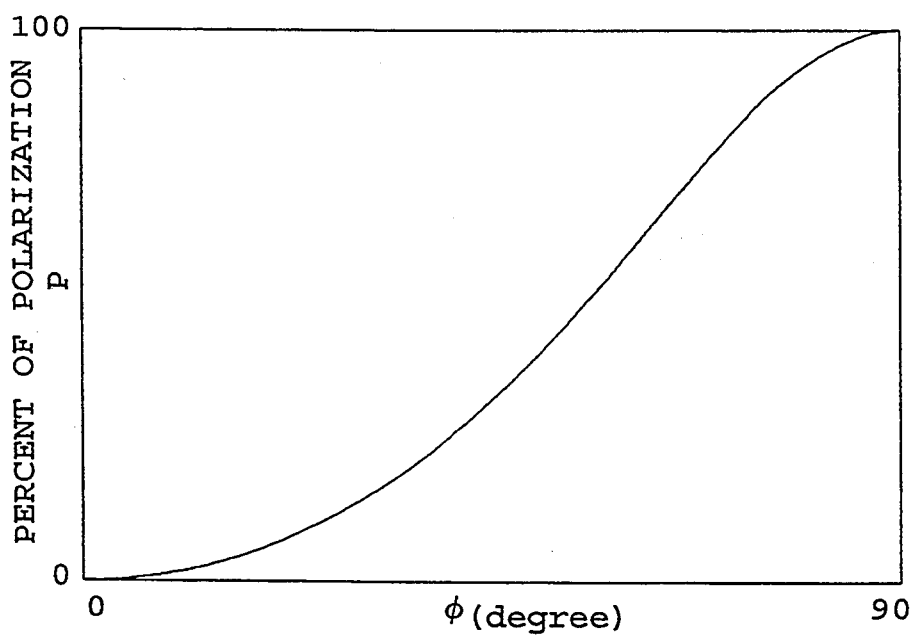

The dependence of intensity and polarization on $\phi$ is illustrated in FIGS. 2A and 2B. FIG. 2A shows data for thermal radiation at a wavelength of 12 microns emitted at the surface of aluminum. Curve 560 is the relative intensity $I_{PL}$ at sensor 540 of thermal radiation emitted at object point 500 with polarization in the plane defined by vectors a and n referred to in FIG. 1. Curve 580 is the relative intensity $I_{PR}$ of thermal radiation emitted at object point 500 with polarization perpendicular to the plane defined by vectors a and n referred to in FIG. 1. The percent of polarization is defined as $$P = \frac{I_{PL} - I_{PR}}{I_{PL} + I_{PR}} \cdot 100 \tag{1}$$

and is plotted in FIG. 2B. As is apparent from FIG. 2B, a measurement of P would determine the angle $\phi$.

Experiment and theory have established that at any given angle $\phi$ the maximum intensity will occur for a plane of polarization parallel to the plane defined by vectors a and n. Finding this plane of polarization with maximum intensity would determine $\theta$.

What follows is a description of a method for determining $\phi$ and $\theta$ at a plurality of object points, thereby enabling the recognition of objects by their shapes and poses. Then a description will be given of an apparatus which practices this method.

The method involves measuring Stokes parameters to determine P and $\theta$. Referring to FIG. 1, a beam of radiation emitted from an object point 500 can be completely described at a given wavelength by the four Stokes parameters. The first Stokes parameter is identical to the total intensity of radiation I define above. The second parameter Q is a measure of the amount of linear polarization in the horizontal direction. The third parameter U measures the amount of linear polarization at 45 degrees from the horizontal. The fourth parameter V is associated with the circular polarization. V is very small compared to I, Q, and U for radiation emitted in natural scenes and will be neglected in the preferred embodiment described here.

The Stokes parameters can be transformed into percent of polarization P and angle of polarization $\theta$ using the relations, $$P = \frac{\sqrt{Q^2 + U^2}}{I} \cdot 100 \tag{2}$$

$$\theta = \frac{1}{2} \cdot \arctan\left(\frac{U}{Q}\right)$$

Note that $\theta$ and $\theta + \pi$ would result from the same measured values of U and Q. This ambiguity can be resolved by the recognition processor described below.

Figure 3:
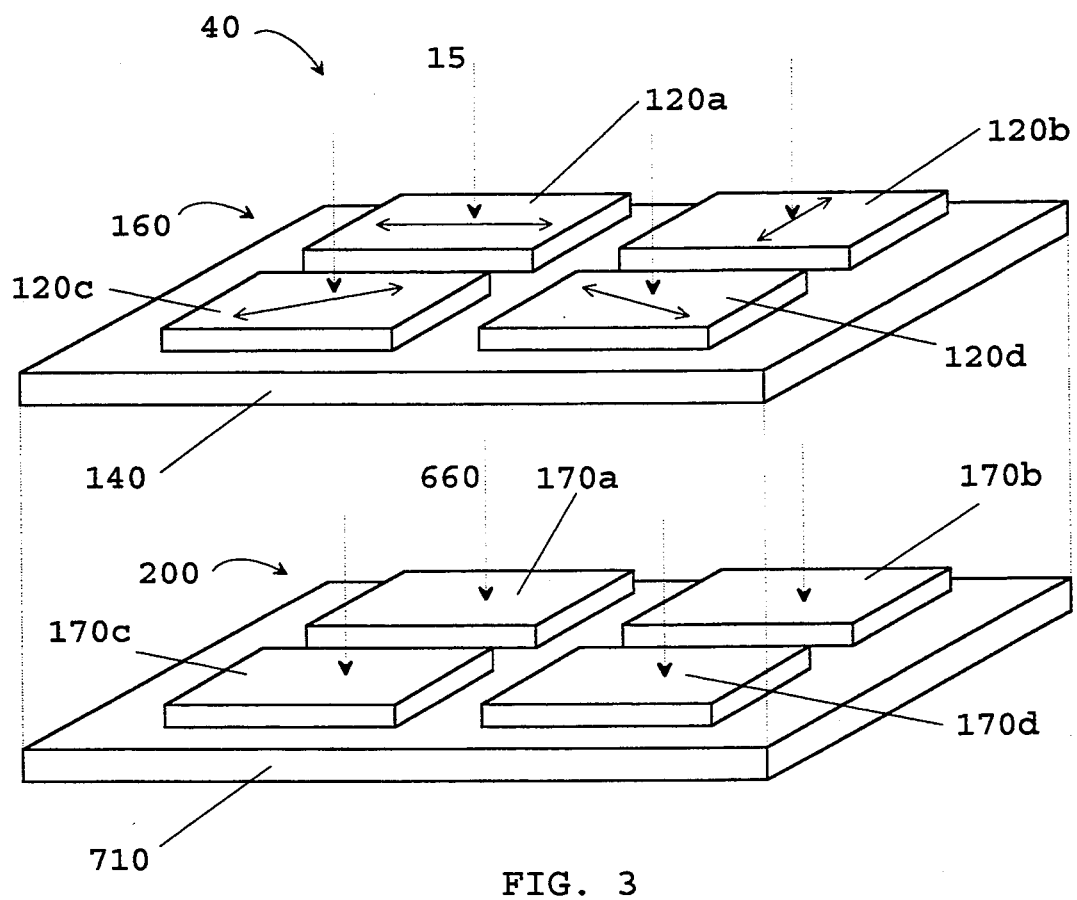
FIG. 3 is a schematic view of a group of four neighboring pixels arranged to have polarizers with rotated planes of polarization.

The Stokes parameters for radiation from an object point 500 in FIG. 1 can be determined using a receiver assembly 40 illustrated in FIG. 3. The receiver assembly 40 is a combination of a polarizer subarray 160 and a photodetector subarray 200. The photodetector subarray 200 includes optical sensors 170a, 170b, 170c, and 170d and the electronic circuitry necessary for biasing and amplifying the electronic signals in response to irradiation of the photodetectors.

Again referring to FIG. 3, the polarizer subarray 160 includes polarizers 120a, 120b, 120c, and 120d. Polarizer subarray 160 is placed relative to photodetector subarray 200 such that all light entering optical sensor 170a is first intercepted by polarizer 120a, all light entering optical sensor 170b is first intercepted by polarizer 120b, all light entering optical sensor 170c is first intercepted by polarizer 120c, and all light entering optical sensor 170d is first intercepted by polarizer 120d. Polarizer 120a is a linear polarizer with a plane of polarization at 0° as indicated by double-headed arrows in FIG. 3. Polarizer 120b is a linear polarizer with a plane of polarization at 90°. Polarizer 120c is a linear polarizer with a plane of polarization at 45°. Polarizer 120d is a linear polarizer with a plane of polarization at 135°. If optical sensors 170a, 170b, 170c, and 170d view a localized area at object point 500 in FIG. 1, then the Stokes parameters of the radiation originating near object point 500 can be determined using the relations, $$I = [\tfrac{1}{2}] \cdot [i(0) + i(45) + i(90) + i(135)]$$

$$Q = i(0) + i(90) \tag{3}$$

$$U = i(45) + i(135)$$

where i(x) is the intensity measured with the polarizer oriented at x degrees. Optical sensors 170a, 170b, 170c, and 170d can be arranged to view a localized area using the preferred embodiment described later.

To summarize, the procedure for determining the surface orientation at an object point 500 involves, in this order, intercepting radiation from object point 500 with receiver assembly 40, determining the Stokes parameters I, Q, and U using Eqs. 3, determining percentage of polarization P and angle of polarization $\theta$ using Eqs. 2, and determining angle $\phi$ from data relating P and $\phi$ for the material comprising the object's surface. The angles $\phi$ and $\theta$ specify the surface orientation at object point 500.

It is appreciated that, in principle, the determination of Stokes parameters I, Q, and U requires only three orientations of linear polarizers. The method disclosed here uses four polarizers oriented at 0°, 45°, 90°, and 135°, because the resulting calculation of I, Q, and U involves simple sums and differences as given in Eqs. 3.

Figure 4:
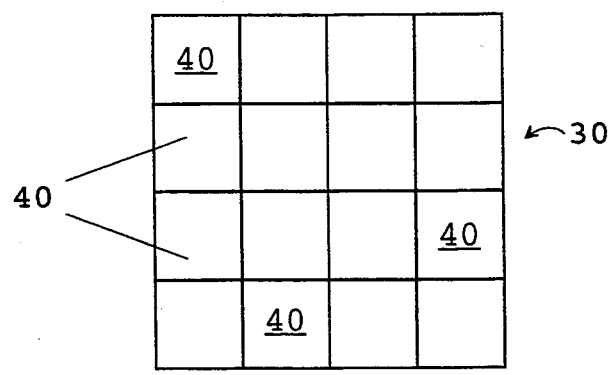
FIG. 4 shows in block format an ensemble of receiver assemblies of the type shown in FIG. 3 arranged to form an array.

The above method of determining surface orientation at an object point can be used to significant advantage in an imaging system where an ensemble of receiver assemblies 40 are used simultaneously. FIG. 4 shows an ensemble 30 of receiver assemblies 40. Using the ensemble 30, surface orientation at a plurality of surface points can be determined for an object thereby establishing the object's shape and pose. In addition, the ensemble 30 will be able to respond to radiation from more than one object. Surface orientation as given by $\theta$ and $\phi$ can be used for segmentation, i.e. the process that distinguishes in an image one object from another object. A description follows of an imaging method which uses the ensemble 30 of receiver assemblies 40 to determine shapes and poses of objects.

Figure 5:
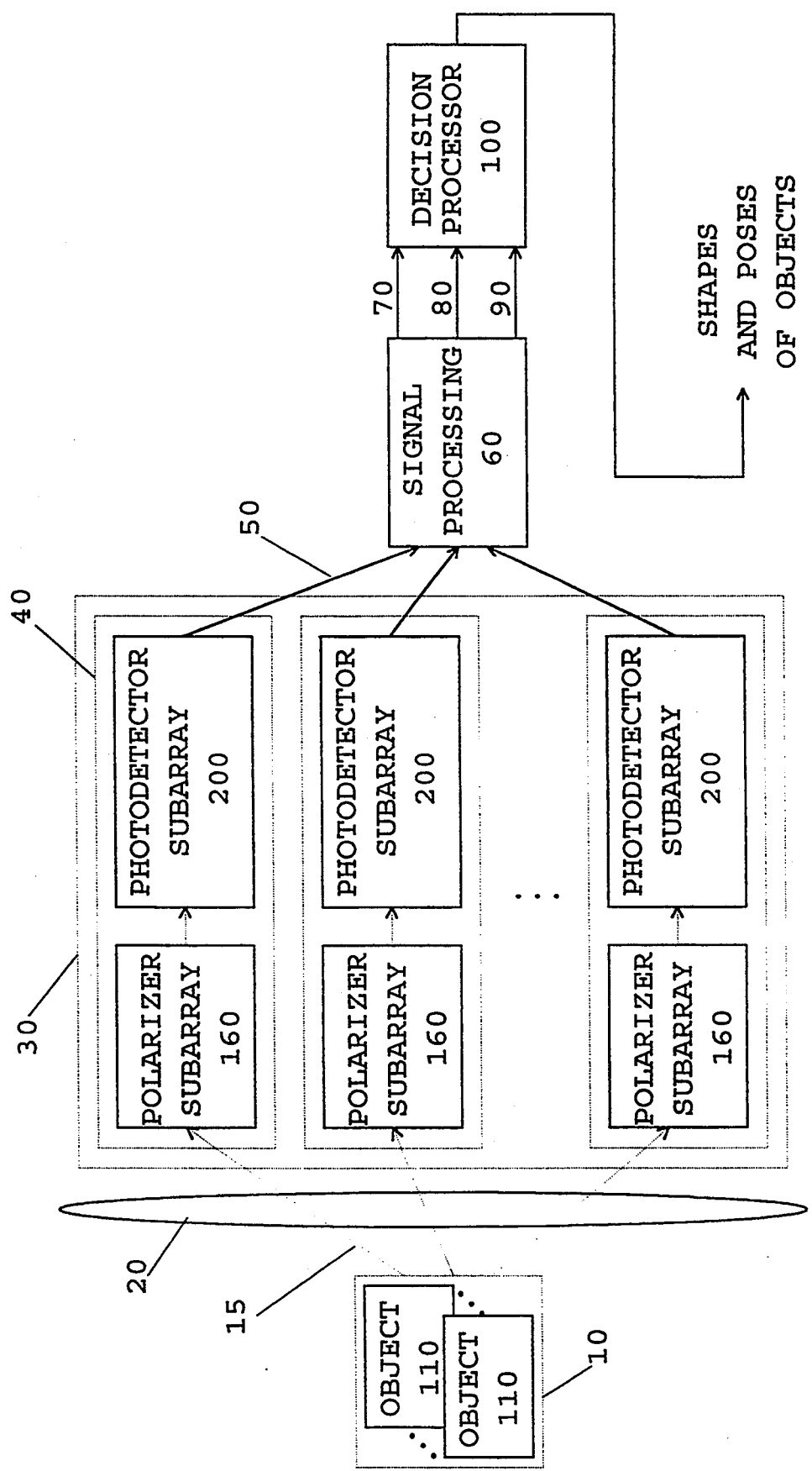
FIG. 5 shows in schematic block format an apparatus for determining shape and pose of objects in a field of view. The dotted connecting lines between elements constitute optical coupling, and the solid lines constitute electrical couplings.

Referring to FIG. 5, a group of objects 10 emits radiation 15 which is imaged by lens 20 onto a two-dimensional ensemble 30 of receiver assemblies 40. The outputs of the receiver assemblies 40 are electrical signals 50 which contain information on the intensity I, percent of polarization P, and angle of polarization $\theta$ of the radiation 15 incident on such receiver assemblies 40. The electrical signals 50 from all receivers 40 are combined using electronic signal processor 60. The output from the signal processor 60 is a two-dimensional image 70 of the intensity I of radiation 15 emitted by the group of objects 10, a two-dimensional image 80 of the percent of polarization P of the radiation 15, and a two-dimensional image 90 of the angle of polarization $\theta$ of the radiation 15. The image 70 of intensity, the image 80 of percent of polarization, and the image 90 of the angle of polarization are entered into a recognition processor 100. The output of recognition processor 100 is a determination of the shapes and pose of objects 110 in the group 10. The recognition processor 100 can be either electronic or photonic circuitry or a human observing the images 70, 80, and 90 on displays.

As was noted above in reference to Eqs. 2, $\theta$ and $\theta + \pi$ would result from the same measured values of Stokes parameters U and Q. This ambiguity can be removed by the recognition processor 100 by observing that for most natural scenes the vector n at object points near limbs points away from the center of the object.

The preferred embodiment will now be described of an apparatus which practices the above method for determining shapes and poses of objects.

In practice, the photodetector subarray 200 shown in FIG. 3 can be a group of neighboring photodiodes in a focal plane array sensor. Such sensors are commercially available and are reviewed in Special Issue on Solid-State Imaging Sensors, IEEE Transactions on Electron Devices, Vol. 38, No. 5 (1991). As noted above, Eqs. 3 can be used to determine Stokes parameters I, Q, and U provided the photodetectors in subarray 200 view a localized area at an object point. A localized area can be viewed if the focal plane array has high spatial resolution relative to the overall dimensions of the object. Higher spatial resolution can be obtained from the dramatically increasing sizes of commercially available detector arrays for infrared thermal imaging, up to 480×640 pixels at present and doubling in size approximately every 18 months.

Figure 6:
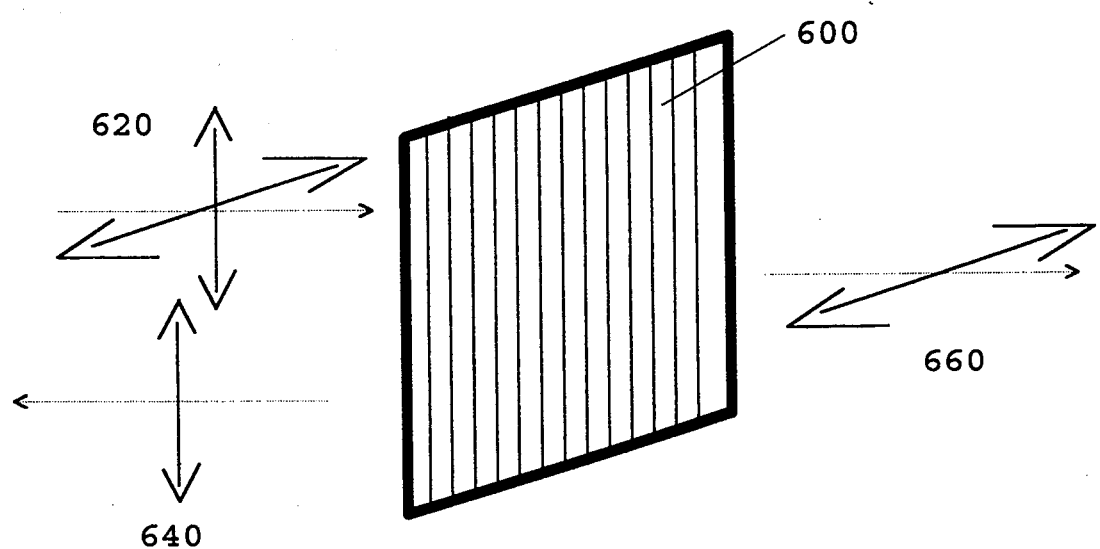
FIG. 6 shows the operation of the wire grid polarizer used in the present apparatus.

Referring again to FIG. 3, a practical realization of polarizer subarray 160 is as an array of wire grid polarizers. Wire grid polarizers are know in the art and their operation can be described with reference to FIG. 6. A wire grid polarizer 600 is a set of parallel metal wires with spacings between adjacent wires much less than the wavelength of the incident unpolarized light 620. The component of incident light 620 with plane of polarization parallel to the wires is reflected, indicated in FIG. 6 as reflected light 640. The component of incident light 620 with plane of polarization perpendicular to the wires is transmitted as indicated by transmitted light 660. In practice, an ensemble of subarrays 160 of wire grid polarizers, corresponding to the ensemble 30 of receiver assemblies 40 referred to in FIG. 4, can be formed on a single, planar, transparent substrate 140 using well established techniques of depositing metal films and microlithographic patterning. The photodetector subarrays corresponding to the same ensemble 30 of receiver assemblies 40 can be a single focal plane array as described in the previous paragraph.

Figure 7A:
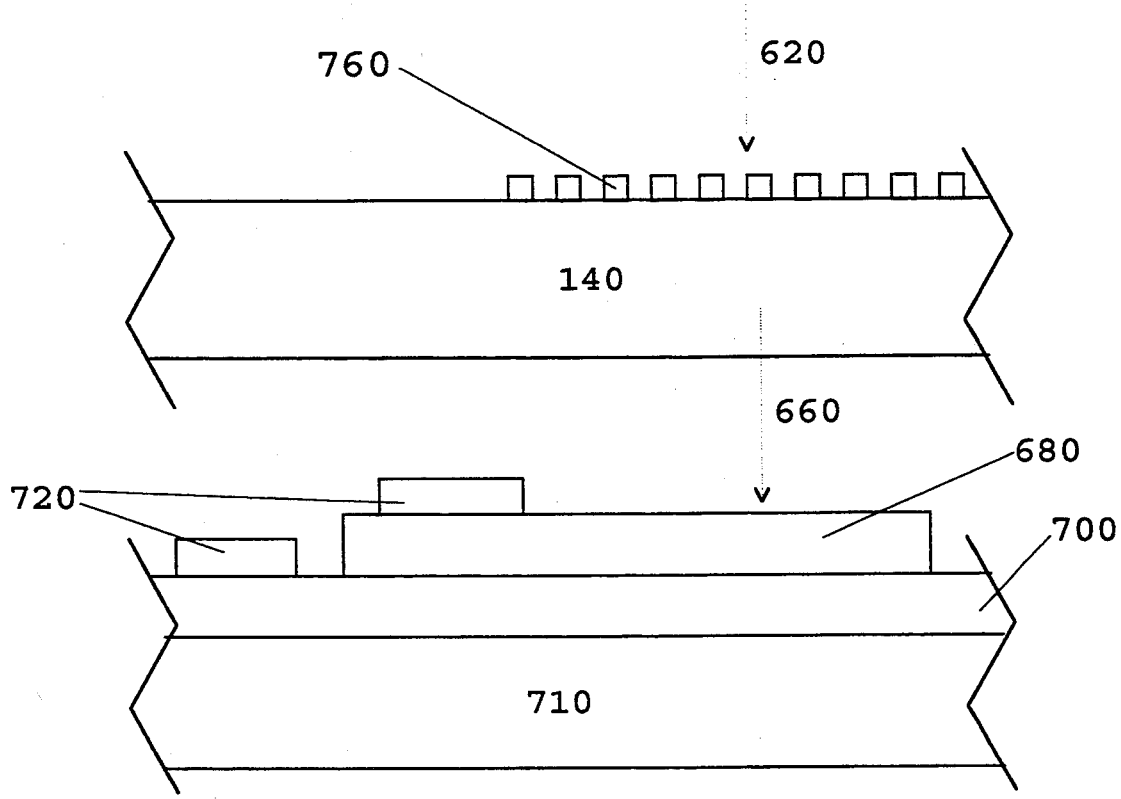
FIGS. 7A and 7B show in cross sectional side view an embodiment where polarizers and photodetector are supported by separate substrates.

FIGS. 7A-7B, 8A-8C show various practical arrangements of a polarizer from polarizer subarray 160 and the corresponding photodetector from photodetector subarray 200. The arrangement in FIG. 7(a) shown in cross sectional side view uses a front illuminated photodetector as defined by semiconductor n-type region 680, semiconductor p-type region 700, and metal contacts 720. The photodetector is supported by substrate 710. The wire grid polarizer 760 is supported by substrate 140. Unpolarized light 620 is incident on the polarizer 760. The polarizer transmits only light with the selected plane of polarization. The transmitted light 660 is incident on the photodetector and causes the photodetector to output a signal.

Figure 7B:
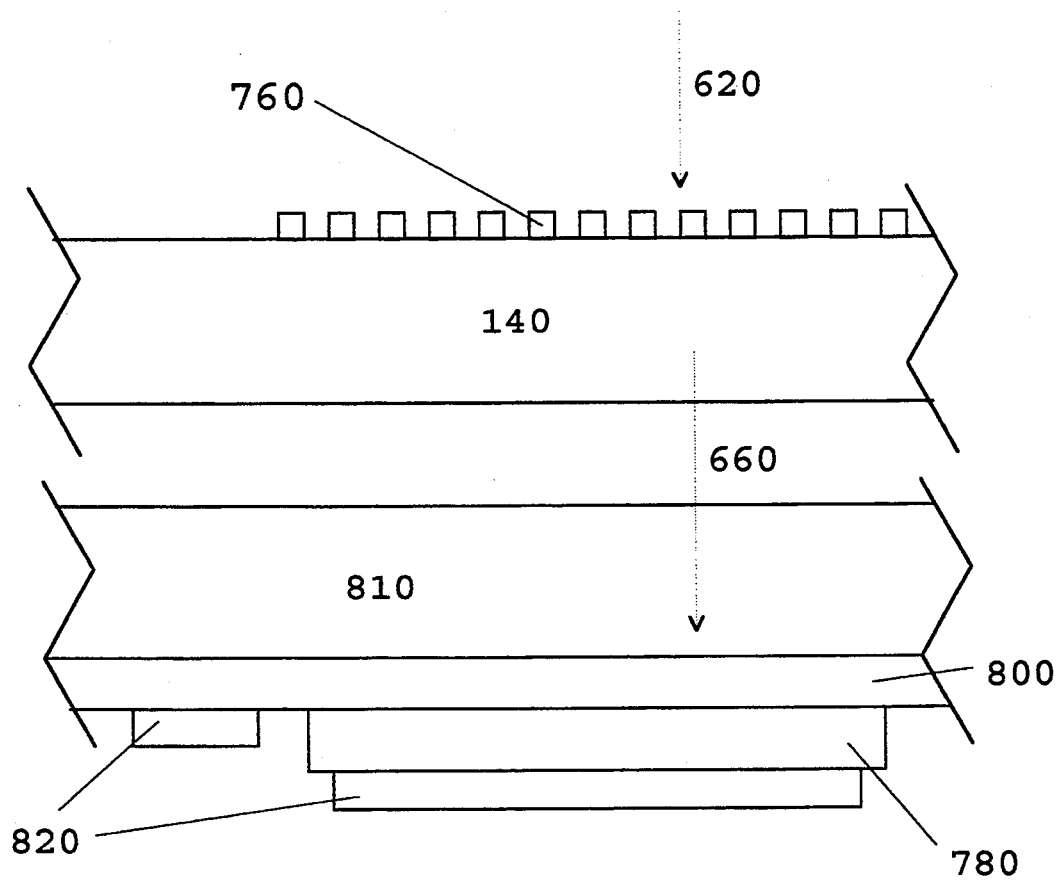

FIG. 7B shows an arrangement using a back illuminated photodetector. Back illuminated photodetectors are commonly used in commercially available infrared focal plane arrays. The photodetector is defined by semiconductor n-type region 780, semiconductor p-type region 800, and metal contacts 820. The back illuminated photodetector is supported by transparent substrate 810.

Figure 8A:
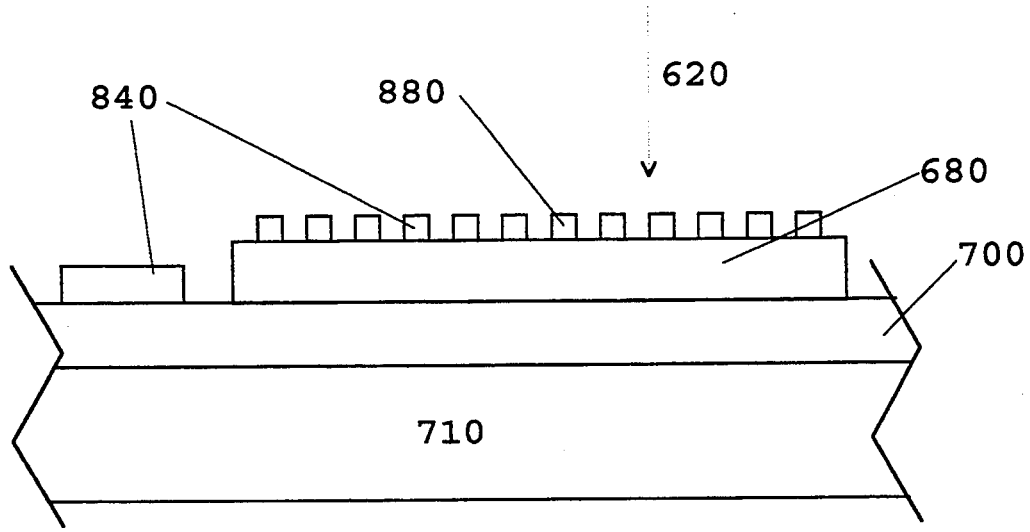
FIGS. 8A and 8B show in cross sectional side view an embodiment where polarizers and photodetector are supported by the same substrate.
Figure 8B:
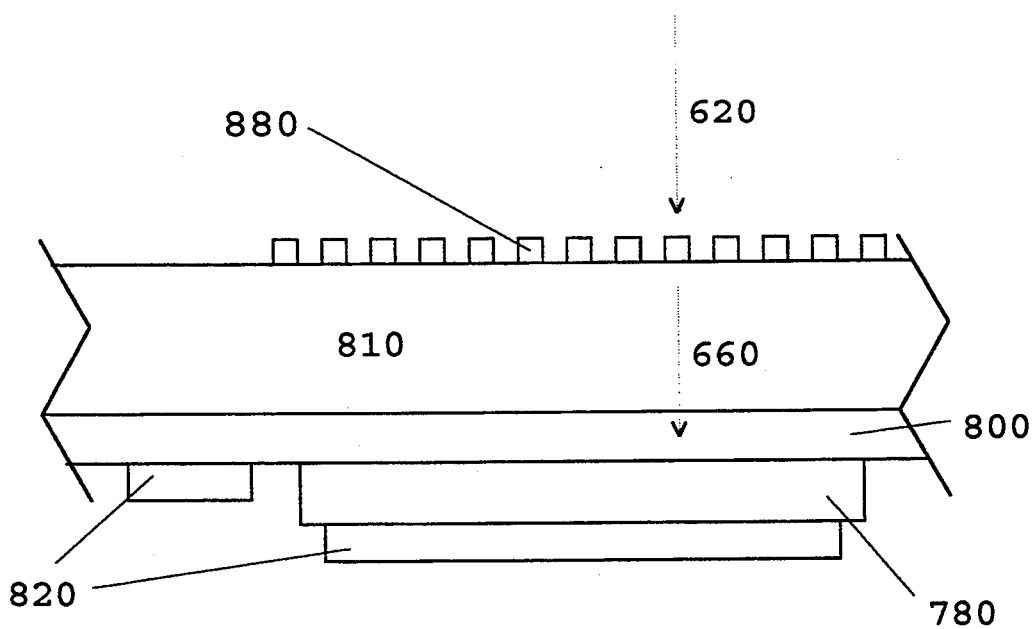
Figure 8C:
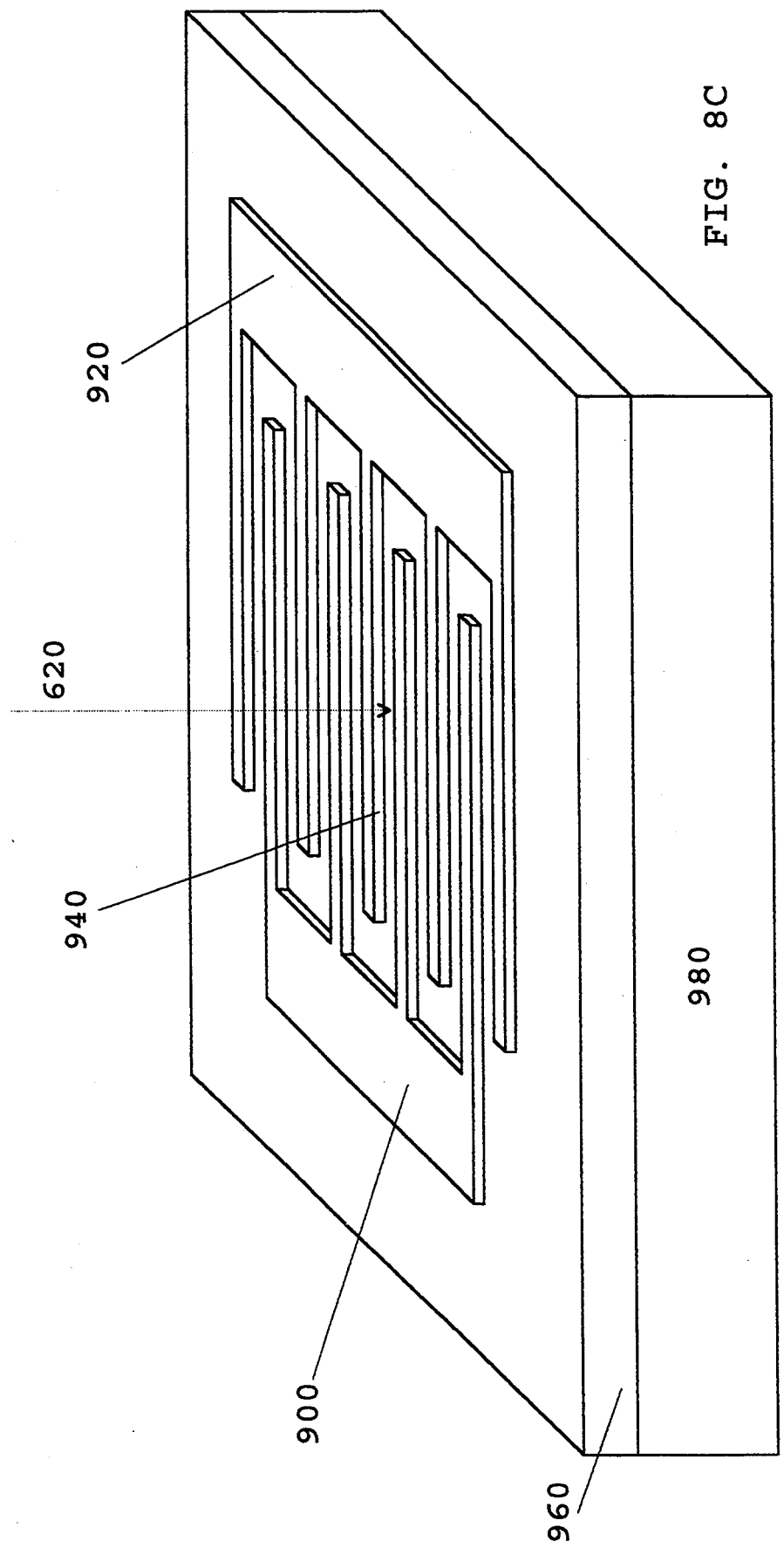
FIG. 8C is a schematic perspective view of an embodiment where the interdigitated metal contacts of the photodetector form a wire grid polarizer.

FIGS. 8A-8C show configurations where the wire grid polarizer is monolithically integrated with the photodetector. In monolithic integration, both polarizers and photodetectors are fabricated on the same substrate using microlithographic techniques. The substrate supports the polarizers and photodetectors and keeps each polarizer in alignment with the corresponding photodetector. FIG. 8B illustrates an arrangement with a back illuminated photodetector where the wire grid polarizer 860 is located on and supported by the back surface of substrate 810 which also supports the photodetector.

The configuration shown in FIG. 8A is for a front illuminated photodetector. In this configuration, the metal contacts and wire grid polarizer can be separate elements, or at least one of the metal contacts 840 can be arranged to form a wire grid polarizer 860.

FIG. 8C illustrates another arrangement where the polarizer is monolithically integrated with the photodetector. Portions of metal contact 900 and portions of metal contact 920 form a wire grid which acts as a wire grid polarizer 940. Metal contact 900 and metal contact 920 form Schottky barriers with a single semiconductor material 960. The semiconductor material 960 can be self-supporting or can be supported by a substrate 980. In operation, unpolarized light 620 is incident on the polarizer. Only the component of incident light 620 which has a plane of polarization perpendicular to the wires is transmitted by the polarizer. The transmitted light enters the semiconductor region where the light is converted into a photocurrent. The photocurrent is conveyed out of the photodetector by metal contact 900 and metal contact 920 to suitable electrical signal amplification and processing circuitry.

The arrangement shown in FIG. 8C where the metal contacts 900 and 920 form an interdigitated pattern is know in the art as a metal-semiconductor-metal photodetector, called an MSM detector. The MSM detector has been investigated for its high speed of response to changes in the intensity of incident light. However, for the purposes of the present invention, the arrangement shown in FIG. 8C has a new use as an integrated polarizer and photodetector which is responsive only to a selectable plane of polarization of the incident light 620.

Although the present invention has been described above in its preferred embodiment, alternative embodiments are possible which use the method described above. The polarizer array described above can be combined with two-dimensional imaging sensors such as charge-coupled device (CCD) arrays, vidicons, pyroelectric detector arrays, and bolometer arrays.

The polarizer subarray 160 in FIG. 3 does not have to be located in close proximity to the photodetector subarray 200. Instead, polarizer subarray 160 can be placed at a first optical image plane, and photodetector subarray 200 can be placed at a second optical image plane. Light from polarizer subarray 160 can be directed and conveyed to photodetector subarray 200 by optical elements such as lens and optical fibers.

The preferred embodiment is capable of measuring Stokes parameters I, Q, and U over a two-dimensional distribution corresponding to the field of view. Although the preferred embodiment was described for a sensor at infrared wavelengths, the method of measuring I, Q, and U can also be applied to visible wavelengths. Present day microlithography techniques permit the fabrication of wire grids with wire spacings as close as 60 nanometers.

Elliptical and circular polarization states of light can be distinguished over a two-dimensional distribution corresponding to the field of view by placing a quarter-wave retarder in front of the ensemble 30 of receiver assemblies shown in FIG. 4.

While the invention has been described in its preferred embodiments, it is understood that the words which have been used are words of limitations and that changes within the purview of the appended claims may be made without departing from the scope and spirit of the invention in its broader aspects.

What is claimed is:

1. Apparatus for obtaining data concerning the characteristics of objects within a field of view comprising:
   means for directing electromagnetic waves from object points onto a plurality of assemblies wherein each said assembly responds only to said waves originating from a respective object point, with each said assembly including:
   a first linear polarizer element and a first means to detect said waves passing through said first polarizing element,
   a second linear polarizer element which transmits said waves with polarization different from said waves transmitted through said first polarizing element and a second means for detecting said waves passing through said second polarizing element,
   a third linear polarizer element which transmits said waves with polarization different from said waves transmitted through said first polarizing element and through said second polarizing element and a third means for detecting said waves passing through said third polarizing element,
   means for combining signals from said first detection means and said second detection means and said third detection means to yield output signals corresponding to data including at least one of intensity, percent of polarization, and angle of polarization of said waves incident on said assembly.

2. The apparatus of claim 1, wherein each said assembly further includes means for combining signals from said first detection means and said second detection means and said third detection means to yield output signals corresponding to the orientation of the plane tangent to the surface at the object point respective to said assembly.

3. The apparatus of claim 2 wherein said first, second and third linear polarizing elements are each a wire grid polarizer.

4. The apparatus of claim 3 wherein said electromagnetic waves include thermal radiation emitted by objects.

5. The apparatus of claim 4, wherein said first detection means and second detection means and third detection means are elements of a focal plane array.

6. The apparatus of claim 1, further including means for combining output signals from two or more of said assemblies to yield output signals corresponding to the shape of objects contributing to said object points.

7. The apparatus of claim 6, wherein said first, second and third linear polarizing elements are each a wire grid polarizer.

8. The apparatus of claim 7, wherein said first detection means and second detection means and third detection means are elements of a focal plane array.

9. The apparatus of claim 8, wherein said electromagnetic waves include thermal radiation emitted by objects in the field of view.

10. The apparatus of claim 1, wherein said first, second and third linear polarizing element are each a wire grid polarizer.

11. The apparatus of claim 10, wherein said first detection means and second detection means and third detection means are elements of a focal plane array.

12. The apparatus of claim 11, wherein said electromagnetic waves include thermal radiation emitted by objects in the field of view.

13. The apparatus of claim 12, wherein said wire grid polarizer is fabricated using microlithography.

14. A method for obtaining data concerning the surface characteristics of objects within a field of view comprising:
   directing electromagnetic waves from object points on said surface onto a plurality of assemblies whereby each said assembly includes a plurality of linear polarizing elements and a corresponding plurality of detecting means, said assemblies responding only to said waves originating from a respective object point;
   directing a first portion of said electromagnetic waves through a first of said plurality of linear polarizer elements and into a first of said plurality of detecting mean;

directing a second portion of said electromagnetic waves through a second of said plurality of linear polarizer elements which transmits said waves with polarization different from said waves transmitted through said first of said plurality of polarizing elements and into a second of said plurality of detecting means for detecting said waves passing through said second of said plurality of polarizing elements;

directing a third portion of said electromagnetic waves through a third of said plurality of linear polarizer elements which transmits said waves with polarization different from said waves transmitted through said first and second of said plurality of polarizing element and into a third of said plurality of detecting means for detecting said waves passing through said third of said plurality of polarizing elements;

combining signals from said first, second and third of said plurality of detecting means to yield output signals corresponding to data including at least one of intensity, percent of polarization, and angle of polarization of said waves incident on said assembly.

15. The method of claim 14 further including combining signals from said first, second and third of said plurality of detecting means to yield output signals corresponding to the orientation of the plane tangent to said surface at the object point respective to said assembly.

16. The method of claim 14 further including combining output signals from two or more of said assemblies to yield output signals corresponding to the shape of objects contributing to said object points.

* * * * *